United States Patent Office 2,871,066
Patented Jan. 27, 1959

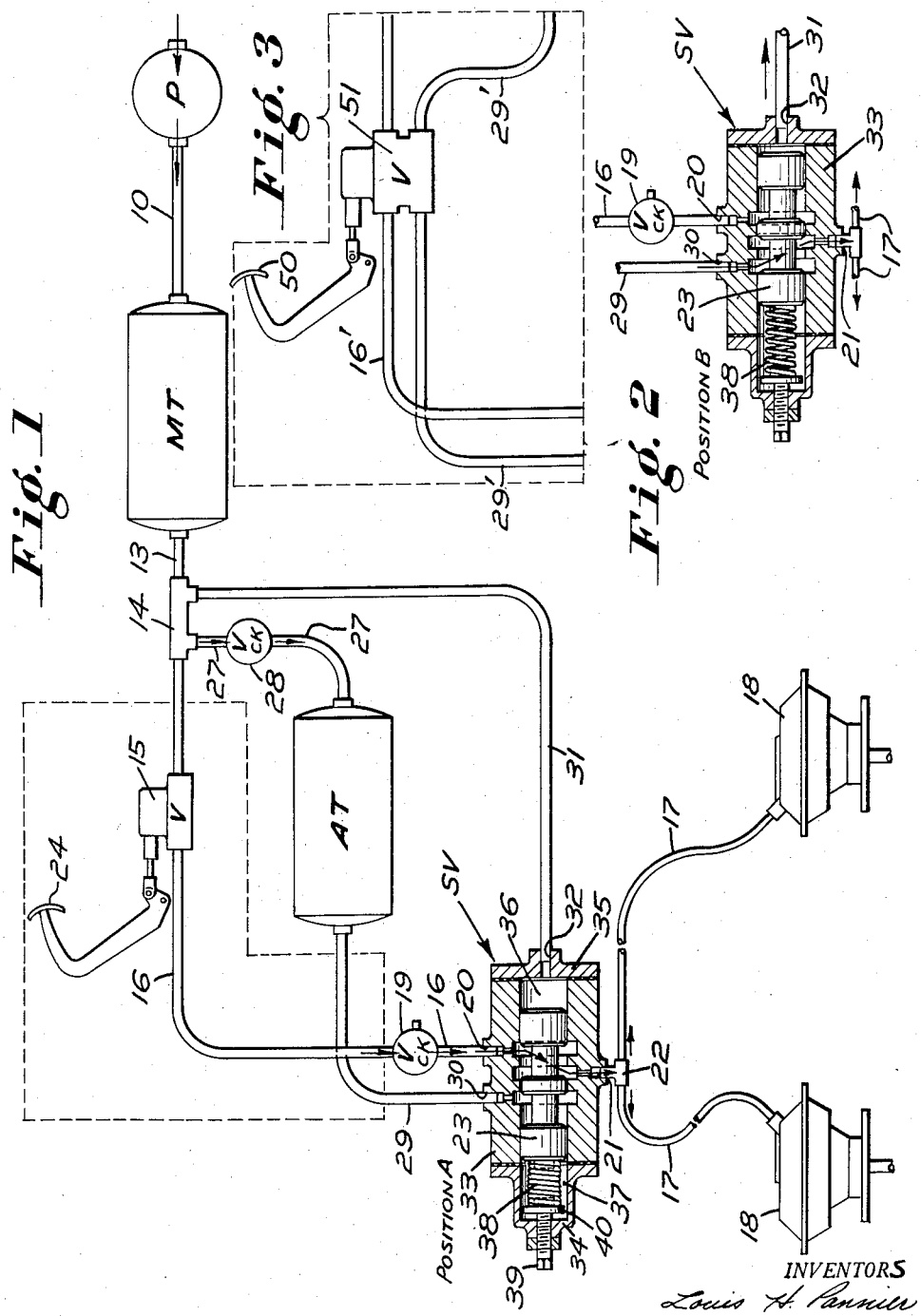

2,871,066

AUTOMATIC SAFETY BRAKE SYSTEM

Louis Henry Pannier and John M. Ey, Pittsburgh, Pa.

Application February 10, 1954, Serial No. 409,348

3 Claims. (Cl. 303—63)

This invention relates to a fluid actuated braking system for vehicles, and more particularly to an auxiliary or safety system which is automatically operative for actuating the brakes upon failure of the main system.

The present braking system was designed specifically for use with the air brake systems of trailer trucks, but has utility wherever fluid operated braking systems are used. In any fluid system of the type contemplated, leaks are likely to be present. If the brake actuating fluid-pressure system develops a leak and the vehicle sits for an appreciable period of time, the pressure in the main storage tank is likely to be insufficient to brake the vehicle once it is rolling. Of course, a failure of pressure in the braking system at any time will render the brakes inoperative. Many accidents are a direct result of the failure of the fluid pressure system.

Accordingly, it is the main object of this invention to provide a fluid-pressure actuated braking system for vehicles which is operative even when the main fluid-pressure system is faulty.

Another object of this invention is to provide a braking system for vehicles which selectively utilizes a main and an auxiliary or emergency brake actuating system for the vehicle brake units.

Still another object of this invention is to provide a system of the character referred to wherein the main and auxiliary brake actuating systems are selectively utilized in accordance with a condition of the main brake actuating system.

Still another object of this invention is to provide a system of the character referred to which may be readily applied to existing braking systems for vehicles and which is simple, positive in operation and inexpensive.

The objects stated are merely illustrative. These and other objects will become more apparent from a study of the following specification and the accompanying drawings in which:

Fig. 1 is schematic drawing of one embodiment of the braking system with the selector valve in section, Fig. 2 shows a sectional view of the selector valve, and Fig. 3 is a schematic drawing of a section of a system which may be substituted in Figure 1 to show another embodiment of the invention.

As illustrated in Figure 1, the main braking system consists of a pump or compressor P connected by means of the conduit or line 10 to the main fluid-pressure storage tank MT which is connected through the conduit 13, multi-branch fitting 14, applicator valve 15, and fluid outlet line 16, with the check release valve 19 interposed in it, selector valve SV, and conduits or lines 17 to the brake units 18. The fluid outlet line 16 is connected to the selector valve SV at a main inlet port 20 and the line 17 to the brake units 18 are connected to the selector valve SV at an outlet port 21 by means of a T fitting 22. When the plunger 23 of the selector valve SV is in the position shown in Figure 1 (designated "Position A"), the fluid outlet line 16 of the main brake actuating system communicates directly with the brake units 18.

To actuate the vehicle brake units 18 with the plunger 23 of selector valve SV in Position A as shown in Figure 1, the brake pedal 24 is depressed by the operator to open the applicator valve 15, which allows the main fluid-pressure tank MT to communicate directly with the fluid outlet line 16. The check release valve 19 interposed in the fluid outlet line 16, is of a conventional type and opens immediately when positive pressure is applied from the main fluid-pressure tank MT to the fluid outlet line 16. Therefore, upon depression of the brake pedal 24, fluid pressure from the main tank MT is applied to the brake units 18 and the brakes of the vehicle are thereby applied. When the applicator valve 15 is closed by release of the brake pedal 24, the fluid outlet line 16, and consequently, the check release valve 19, is isolated from the main fluid-pressure tank MT. Immediately upon cessation of the positive pressure upon the check release valve 19, it opens, vents the fluid outlet line 16 to the atmosphere and thereby relieves the brake units 18 from fluid pressure and allows them to release. The vehicle brakes are usually spring returned for quick and positive release.

The additional equipment which is utilized for the auxiliary or emergency braking system includes a fluid inlet line 27 with a ball check valve 28 interposed therein, an auxiliary fluid-pressure tank AT, a fluid pressure line 29 connected to communicate with the selector valve SV at an auxiliary inlet port 30, and the pressure line 31 connected between a multi-branch fitting 14 and a pressure chamber inlet port 32 of the selector valve SV. A conventional pump or compressor P, main tank MT, line 13, selector valve SV, lines 17 and brakes units 18 are also utilized with the auxiliary brake actuating system.

The selector valve SV, as seen in section in Figures 1 and 2, has a hollow cylindrical case, body or wall 33 and end walls 34 and 35 at its opposite ends. The main and auxiliary inlet ports 20 and 30, respectively, and the outlet port 21 are located in the cylindrical case or wall 33 and the pressure chamber inlet port 32 is located in the end wall 35 of the selector valve SV. The plunger 23 is generally cylindrical in shape with two turned-down portions spaced along its longitudinal axis to leave an enlarged portion at each end and an enlarged portion at the center. The plunger 23 is positioned in the cylindrical chamber of the selector valve, so that its enlarged portions fit snugly against the inner surface of the cylindrical valve wall 33. Thus positioned, one end of the plunger 23 defines a pressure chamber 36 with the cylindrical wall 33 and the end wall 35 of the valve and a pressure chamber 37 is defined by the opposite end of the plunger 23 and the cylindrical wall and the end wall 34. The two turned-down portions of the plunger 23 each define a fluid chamber with the cylindrical wall 33 of the valve. The enlarged portions of the plunger 23 are so fitted with respect to the inner surface of the cylindrical wall 33 that each chamber within the valve is sealed from the others. O-ring seals or seals of any other suitable type may be used if necessary or desired.

When the plunger 23 is in its extreme left hand position, i. e., Position A as shown in Figure 1, the main inlet port 20 communicates through the selector valve SV with the outlet port 21 and the enlarged center portion of the plunger 23 isolates both the main inlet port 20 and the outlet port 21 from the auxiliary inlet port 30. Under these circumstances, the main brake actuating system is set up to actuate the brake units 18, as described above. However, when the plunger 23 is in its extreme right hand position, or Position B as indicated in Figure 2 of the drawings, the enlarged center portion of the plunger is positioned to allow the auxiliary inlet port 30 to communicate with the outlet port 21 and to isolate the two from the main inlet port 20.

With the plunger in this position, the selector valve is set up so that the auxiliary fluid-pressure brake actuating system is operative on the brake units 18.

The plunger 23 is automatically positioned to select which system shall operate on the brake units 18 in accordance with the pressure available for work in the main fluid-pressure system. This is accomplished by providing a spring member 38 in the pressure chamber 37 at the left end of the selector valve SV compressed against the left end of plunger 23, and opposing the pressure of the spring on the plunger with a pressure which is a function of the pressure in the main fluid-pressure system by applying it in the pressure chamber 36 at the right end of the selector valve SV. The pressure of the main system is supplied in the pressure chamber 36 by means of the line 31 connected between the pressure chamber inlet port 32 and the multi-branch fitting 14. An adjusting screw 39 with a bearing plate 40 against a compression spring 38 is provided to adjust the compression of the spring 40 and thus, the magnitude of the pressure in the main fluid-pressure system at which the plunger 23 of the selector valve SV will shift from Position A to Position B, and vice versa.

When the plunger 23 of the selector valve SV is in the position to select the emergency system (the plunger 23 is at its extreme right hand position or in Position B of Figure 2) the pressure is applied automatically to the brake units 18 and the vehicle is stopped. That is, with the plunger 23 in this position, the auxiliary tank AT communicates directly with the brake units 18 through line 29, auxiliary inlet port 30 and outlet port 21 of the selector valve SV, and lines 17. The only way which the brakes may be released once they have been actuated by the auxiliary system, is to bleed the system or to build up sufficient pressure in the main brake actuating system to cause the selector valve SV to select the main system for operating the brakes. This is an important safety feature, as it prevents accidental or unintentional operation of the vehicle when the fluid pressure in the main system is insufficient to stop it.

The pressure in the auxiliary tank AT is built up and maintained by the main pump or compressor P. The pressure is supplied through the main pressure tank MT, line 13, the multi-branch fitting 14, and the line 27. The ball check valve 28 in line 27 allows a fluid flow from the main system to the auxiliary tank AT when the pressure in the main tank MT is greater than that in the auxiliary tank AT, but prevents back flow from the auxiliary tank AT to the main system. It will be appreciated that the auxiliary brake actuating system is effectively isolated by the ball check valve 28 and the selector valve SV from the main system to prevent reduction of pressure in the auxiliary system due to leaks in the main system.

The system operates in a conventional manner as long as the fluid pressure in that system is maintained at an effective value; e. g., 40 to 120 pounds. A flash indicator (not shown) may be provided which indicates to the vehicle operator when the fluid-pressure is below a given value, such as 65 pounds. If the vehicle is in operation, this will give the operator warning and give him a chance to find a place to park before the pressure falls below 40 pounds. When the pressure reaches the designated low of 40 pounds, the pressure of the spring 38 causes the plunger 23 of the selector valve SV to move its Position B (as shown in Figure 2), and the auxiliary brake actuating system will set the brakes as previously described.

The brake actuating system, illustrated in Figure 1, and described specifically above, was designed to actuate the brake units of the trailer of the trailer truck alone, although it could be used on the truck or tractor as well. However, a preferred embodiment for use on the tractor or truck is made up of the section of a system shown in Figure 3 substituted in Figure 1 for the part enclosed in the broken line box. It will become apparent that the embodiment of the invention described below could also be applied to the trailer.

Figure 3 shows a main fluid outlet line 16' which is substituted for the portion of fluid outlet line 16 in the broken line box of Figure 1, an auxiliary fluid-pressure line 29' which is substituted for the auxiliary fluid-pressure line 29 in the broken line box of Figure 1, a brake pedal 50 which is used in lieu of the brake pedal 24 of Figure 1, and the double applicator valve 51 operated by the brake pedal 50 in lieu of the applicator valve 15 of Figure 1. The arrangement of the double applicator valve 51 is such that when the brake pedal 50 is in its normal position the applicator valve keeps both the main fluid outlet line 16' and the auxiliary fluid pressure line 29' closed, but when the brake pedal 50 is depressed, both of the lines 16' and 29' are opened. The portion of applicator valve 51 which is interposed in the auxiliary fluid pressure line 29' may properly be called an auxiliary applicator valve.

With this arrangement, it will be obvious that the main brake actuating system will operate in the conventional manner as previously described, but the auxiliary system will cause the brake units to be applied only when the brake pedal 50 is depressed to open the applicator valve 51 in the auxiliary fluid pressure line 29' and the plunger 23 of the selector valve SV is in its Position B to enable the auxiliary system due to a deficiency of fluid pressure in the main system.

It should be readily apparent that the objects of this invention have been accomplished by providing a new and novel vehicle braking system which is thoroughly reliable and which has safety features not heretofore found in such systems. The auxiliary system requires a minimum of additional equipment and may be installed without doing a major tear-down job on the installation and the two fluid systems are effectively isolated one from the other which prevents failure of both systems due to a fault of one. The auxiliary system of the first embodiment also prevents operation of the vehicle when the main brake actuating system does not have a sufficient pressure to actuate the brake units.

What we claim is:

1. A system for operating the braking units of a vehicle having a main fluid-pressure brake actuating system provided with a fluid outlet line for the braking units, which fluid outlet line has an applicator valve interposed therein for the purpose of opening and closing the fluid outlet line, comprising an auxiliary fluid-pressure tank, an auxiliary fluid-pressure line leading from said auxiliary fluid-pressure tank, a selector valve interposed between the brake units and the fluid outlet line of the main system and said auxiliary fluid-pressure line, a plunger for said selector valve for selectively connecting the fluid outlet line of the main fluid-pressure brake actuating system and said auxiliary fluid-pressure line to the braking units in accordance with the position of said plunger, said plunger being automatically positioned in accordance with a condition of the main fluid-pressure brake actuating system and an auxiliary applicator valve interposed in said auxiliary fluid-pressure line to open and close said line, operating means for said auxiliary applicator valve for operating said auxiliary applicator valve simultaneously with the applicator valve interposed in the fluid outlet line of the main fluid-pressure brake actuating system.

2. A system for operating the braking units of a vehicle having a main fluid-pressure brake actuating system provided with a fluid outlet line for the braking units, which fluid outlet line has an applicator valve interposed therein for the purpose of opening and closing the fluid outlet line, comprising an auxiliary fluid-pressure tank, an auxiliary fluid-pressure line leading from said auxiliary fluid-pressure tank, a selector valve interposed between the brake units and the fluid outlet line of the main system and said auxiliary fluid-pressure line, a plunger for said selector valve for selectively connecting the fluid outlet line of the main fluid-pressure brake actuating system and said auxiliary fluid-pressure line to the braking units in accordance with its position, said plunger being so positioned within the body of said valve as to define pressure chambers at either end, a spring member located in one of said pressure chambers and a pressure conduit connected between the other of said pressure chambers and the main fluid-pressure brake actuating system to automatically position said plunger, and an auxiliary applicator valve interposed in said auxiliary fluid-pressure line to open and close said line, operating means for said auxiliary applicator valve for operating said auxiliary applicator valve simultaneously with the applicator valve interposed in the fluid outlet line of the main fluid-pressure brake actuating system.

3. An auxiliary brake actuating system for use with a main brake actuating system which main brake actuating system has a compressor supplied main fluid-pressure storage tank connected to communicate with a fluid outlet line in response to the operation of an applicator valve and which auxiliary brake actuating system comprises, an auxiliary fluid-pressure tank, an auxiliary fluid-pressure line leading from said auxiliary fluid-pressure tank, a selector valve interposed between the brake units and the fluid outlet line of the main system and said auxiliary fluid-pressure line, a plunger positioned within said valve walls to define pressure chambers at each end of said valve unit; a main inlet port, an auxiliary inlet port, a pressure chamber inlet port leading into one of said pressure chambers in said valve unit, and an outlet port in the walls of said valve; said main inlet port being connected to the fluid outlet line, said auxiliary inlet port being connected to receive pressure from said auxiliary fluid-pressure line, said pressure chamber inlet port being connected to receive the pressure from the main fluid-pressure system, and said outlet port in the walls of said valve being connected to communicate with the brake units, a spring member located in the remaining pressure chamber of said valve to bias said plunger against movement by the fluid-pressure in the opposite pressure chamber to determine the position of said plunger in accordance with the pressure differential in said pressure chambers, said plunger being shaped so as to selectively create a free passage from said main inlet port and said auxiliary inlet port to said outlet port in accordance with its position, and an auxiliary applicator valve interposed in said auxiliary fluid-pressure line to open and close said line, operating means for said auxiliary applicator valve for operating said auxiliary applicator valve simultaneously with the applicator valve interposed in the fluid outlet line of the main fluid-pressure brake actuating system.

References Cited in the file of this patent

UNITED STATES PATENTS

| 2,232,883 | Neveu | Feb. 25, 1941 |
| 2,240,166 | Stanley | Apr. 29, 1941 |
| 2,289,559 | Turek | July 14, 1942 |

FOREIGN PATENTS

| 203,071 | Great Britain | Sept. 6, 1923 |
| 441,368 | Great Britain | Jan. 17, 1936 |